United States Patent
Kuepper et al.

(10) Patent No.: US 8,691,375 B2
(45) Date of Patent: Apr. 8, 2014

(54) MATERIAL FOR PACKAGING ELECTRONIC COMPONENTS

(75) Inventors: Anton Kuepper, Kaarst (DE); Christian Weinmann, Alsdorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 63 days.

(21) Appl. No.: 13/260,942

(22) PCT Filed: Apr. 1, 2010

(86) PCT No.: PCT/US2010/029534
§ 371 (c)(1),
(2), (4) Date: Sep. 29, 2011

(87) PCT Pub. No.: WO2010/114944
PCT Pub. Date: Oct. 7, 2010

(65) Prior Publication Data
US 2012/0028026 A1    Feb. 2, 2012

(30) Foreign Application Priority Data
Apr. 3, 2009  (EP) .................................. 09157250

(51) Int. Cl.
*B32B 3/26* (2006.01)
(52) U.S. Cl.
USPC .................. 428/304.4; 428/312.8; 428/318.4
(58) Field of Classification Search
USPC ................................. 428/304.4, 312.8, 318.4
See application file for complete search history.

(56) References Cited

U.S. PATENT DOCUMENTS

| 5,453,328 | A  | * | 9/1995 | Nagano et al. ................. 428/545 |
| 5,471,090 | A  |   | 11/1995 | Deutsch et al. |
| 6,882,316 | B2 | * | 4/2005 | McKinzie et al. ..... 343/700 MS |
| 2002/0050783 | A1 | * | 5/2002 | Kubota et al. ................. 313/495 |
| 2003/0142036 | A1 | * | 7/2003 | Wilhelm et al. .............. 343/909 |
| 2006/0186537 | A1 |   | 8/2006 | Goto et al. |
| 2007/0045866 | A1 |   | 3/2007 | Gray et al. |
| 2008/0094178 | A1 | * | 4/2008 | Angerer ....................... 340/10.1 |
| 2008/0105964 | A1 |   | 5/2008 | Iwamura et al. |

FOREIGN PATENT DOCUMENTS

WO  WO 2006/021193       3/2006
WO  WO 2006129869 A1 * 12/2006

OTHER PUBLICATIONS

PCT International Search Report for PCT/US2010/029534, mailed Nov. 11, 2010, 4 pages.

* cited by examiner

*Primary Examiner* — Hai Vo
(74) *Attorney, Agent, or Firm* — Roberts S. Moshrefzadeh

(57) ABSTRACT

The invention provides a material for packaging of electronic components comprising a structured layer, wherein said structured layer comprises a mesh of cells, each cell comprising an electrically conductive rim and an electrically non conductive interior, said cells being interconnected so that any two adjacent cells share at least a portion of their respective rims.

10 Claims, 5 Drawing Sheets

MATERIAL FOR PACKAGING ELECTRONIC COMPONENTS

CROSS REFERENCE TO RELATED APPLICATIONS

This application is a national stage filing under 35 U.S.C. 371 of PCT/US 2010/029534, filed 1 Apr. 2010, which claims priority to European Application No. 09157250.3 filed 3 Apr. 2009, the disclosure of which is incorporated by reference in its/their entirety herein.

TECHNICAL FIELD

The invention relates to a material for packaging of electronic components.

BACKGROUND

In the field of packaging of electronic components metallised (or conductive) foils have a wide application spectrum. They are used for a lot of different reasons such as for example gas or steam tightness, moisture protection, sterile packaging, UV light protection etc. and especially antistatic and electrical discharge protection as well as the attenuation of interfering fields from outside the bag. Such foils may reduce or prevent RFID communication through the foil.

RFID-communication works as follows: an electromagnetic field is sent from a transmitting antenna (RFID-reader) to a receiving antenna (RFID-tag). The received energy may be used for powering the RFID-tag and also for the transfer of information to the RFID-tag. The RFID-tag creates an answer which is a load modulation of the received electromagnetic field, which the RFID-reader detects. The electromagnetic field transmitted by the RFID-reader may create an eddy current in the electrically conductive layer of metallised or conductive foils. The eddy current may generate a reversed magnetic field or a reaction or reflected flux that is working against the electromagnetic field of the RFID-reader thereby reducing or prohibiting the communication through the foil. Another effect of a metallised or conductive foil on a RFID-communication is that a) the RFID-tag does not receive any information because the electromagnetic field is absorbed by the foil and b) the RFID-reader does not see any information as the foil produces a low-impedance or a permanent short circuit and therefore reduces the modulation depth of the signal.

Furthermore the RFID-tag or receiving antenna resonance frequency may be changed because of inductive and capacitive coupling effects of the electrically conductive layer of the foil. All these facts result in the following effects: the receive field and the receive distance of a RFID-communication system is reduced. The answer created by the RFID-tag is reduced so that more sensitive RFID-readers are needed. There is a rising need to equip electronic components with an RFID-tag carrying certain information about the component.

DE 10 2005 018 410 A1 discloses a packaging out of plastic, paper and/or cardboard with a coating containing metal pigments. The coating on the packaging is so thin that it is transmissive for electromagnetic radiation and RFID. According to this document the metallic coating is present for optical reasons.

DE 10 2004 040 831 A1 discloses a packaging for electronic components. The packaging according to the prior art comprises a carrier layer with an electrically conductive layer. The electrically conductive layer provides shielding characteristics to the packaging. The electrically conductive layer has a structure and/or a coating that reduces the shielding characteristic of the electrically conductive layer of the packaging in the area of the structure and/or coating. The structure is described in DE 10 2004 040 831 A1 as a "cut" that divides the electrically conductive plane of the electrically conductive layer into several electrically conductive planes. Relevant for the shielding characteristics of the known packaging are the shape and the dimension of those remaining electrically conductive planes. As examples for a certain shape are described an open and a closed circuit, whereby the shielding characteristics of the open circuit are not very high and the shielding characteristics of the closed circuit are very high. Furthermore, the shielding characteristics of bigger continuous conductive areas are supposed to be better than the shielding characteristics of smaller continuous conductive areas. When such a foil is used as a RFID-transmissive packaging for electronic components it is important to arrange the RFID-tag and the described structure and/or coating in a close relationship. Otherwise the shielding characteristics of the foil would prevent the RFID-communication through the foil.

There is the need to provide a material for packaging of electronic components that has RFID-transmissive characteristics and at the same time antistatic characteristics in a given area.

SUMMARY

The present invention provides a material for packaging of electronic components. The material according to the invention comprises a structured layer. The structured layer comprises a mesh of cells and each cell comprises an electrically conductive rim and an electrically non conductive interior. The cells are interconnected with each other so that any two adjacent cells share at least a portion of their respective rims.

The material for packaging according to the invention may be any kind of material that can be used for packaging, especially for packaging of electronic components, such as for example but not limited computers, handhelds, telephones or printed circuit boards, central processing units, integrated circuits, sensors etc. or explosive materials. The material for packaging according to the invention may be flexible like for example a film or a foil, a sheet or a slide. With such a material it is possible to produce for example bags for packaging of electronic components. Such foils may comprise polyester and/or polyethylene. The material may also be rigid like for example certain kind of plastics, foams, cardboard, coated cardboard, glass fibre reinforced laminates etc. In other words all kind of non-conductive materials used for packaging. With such a rigid material it is possible to produce packaging that provides stability to the components and the possibility to organise and/or arrange the components in the packaging.

The structured layer of the material according to the invention has both RFID-transmissive and antistatic characteristics at the same time and essentially over its entire surface area that it covers. To provide those characteristics the structured layer comprises a pattern in the form of a mesh of cells, each cell having an electrically conductive rim and an electrically non conductive interior. The cells are interconnected with each other such that any two adjacent cells share at least a portion of their respective rim. The portion of the electrically conductive rim the cells share may have a certain length or it may be very short or even only a point. The electrically conductive rims of the structured layer may be made out of any electrically conductive material such as for example metal, semiconductor and/or electrically conductive plastics. The structured layer may even be made out of a silver dissolution. The non conductive interior of the structured layer may be made out of any of the electrically non conductive materials such as for example certain kind of plastics, foams, cardboard, coated cardboard, glass fibre reinforced laminates etc. The non conductive interior may also be an opening in the mesh of electrically conductive cells and therefore contain the air that surrounds the structured layer and the material according to the invention.

In the context of the invention, "electrically conductive" means the ability of a material to conduct an electric current. When an electrical potential difference is placed across an electrically conductive material, its movable charges flow, giving rise to an electric current. In the context of the invention "electrically non conductive" does mean that a certain material does not conduct a current and that when an electrical potential difference is placed across a material there are no essential movable charges and therewith no considerable current that may flow.

The material according to the invention has antistatic characteristics that are provided by the mesh design of the structured layer. This design ensures that the conductivity between individual conductive parts of the foil is still high enough to achieve the antistatic and electric discharge protection property. This is achieved by the mesh of cells with electrically conductive rims covering the structured layer and being connected with each other. When a charge is disposed onto the material according to the invention e.g. by a static discharge it is conducted to all parts of the electrically conductive layer by the interconnected conductive rims thereby equalizing differences in the electrical potential. The conductivity of the material depends on the material of the structured layer as well as the geometry of the pattern—in other words—the conductivity of the electrically conductive rims of the cells depends on e.g. the thickness of the structured layer and/or the thickness of the conductive rims as well as the breadth or width of each conductive rim. Another advantage of the pattern according to the invention is that it allows mass production of the material without knowledge of the shape and the dimension of the packaging that will be made out of the material.

On the other hand the material according to the invention has RFID-transmissive characteristics. This is because the conductivity of the material according to the invention is also low enough to reduce the generation of induced eddy currents on the material. This is also achieved by the mesh design of the structured layer which increases the electrical resistance of the material compared to a completely coated surface and therewith the electrical resistance of possible eddy current paths. This effect depends on the frequency of the transmitted electromagnetic field. The material according to the invention behaves like a low pass filter with a passage frequency for RFID. The achievable damping factor is correlated to eddy current reduction.

In the context of the invention "RFID-transmissive" is used for all materials through which a RFID-communication is possible with commercially available RFID systems, e.g. transmitting antennas (RFID-readers) and receiving antennas (RFID-tags).

In the context of the invention "antistatic" is used for the ability of a material to equalize a potential difference that might occur. It can also be described as a dissipative characteristic of material.

The material according to the invention may comprise at least two layers. One of the two layers may be a carrier layer and the second layer may be the structured layer. The carrier layer may be flexible and may be made out of for example a film or a foil, a sheet or a slide etc. of polyester and/or polyethylene, paper, cardboard etc. The carrier layer may also be rigid and may be made out of foam, rigid plastic, rigid cardboard, coated cardboard etc. In general the carrier layer is made out of electrically non conductive material.

The carrier layer and the structured layer may be arranged in an essentially parallel manner. The structured layer may be a coating on the carrier layer that is modified in a special way to achieve the described structure or it may be a printed layer with the printed pattern being chosen such that the desired structure is achieved. Such a modification process may be implemented in an existing coating step of an existing production line. The structured layer may also be a separate layer that is fixed to the carrier layer for example by gluing, by pressing, by melting or by chemical processes such as for example but not limited by galvanic processes.

In a preferred embodiment of the invention the structured layer covers the carrier layer at least partially. In other words the structured layer may extend substantially over the entire surface of the carrier layer or it may extend at least in such areas of the carrier layer where antistatic and RFID-transmissive characteristics of the material according to the invention are needed. When the material according to the invention is used for example for bags for packaging of electronic components the structured layer may cover the entire surface of the carrier layer. Such a bag provides comprehensive antistatic characteristics and at the same time is RFID-transmissive for RFID-communication irrespective of the location of the RFID-tag within the bag—as long as the bag is not that big that the maximal distance for RFID-communication is exceeded. In other examples the structured layer may only cover a certain area of the carrier layer, e.g. that area, where most probably a RFID-tag will be positioned.

The structured layer and the carrier layer may be arranged in a substantially parallel manner. This may be for example the case when the carrier layer is a foil and the structured layer is a coating of the foil.

According to another embodiment of the invention more than two cells may meet each other at a rim node. A rim node may be defined as a cross point and/or a T-cross point of two or more electrically conductive rims of the cells of the structured layer. A cross point should be understood as a point where one or more rims meet another rim and thereby exceed this rim. A T-cross point should be understood as a point where one rim touches another rim without exceeding this other rim.

As described above the effect of the invention may be influenced for example by the geometric shape of the pattern of the structured layer. It should be noted that when describing the pattern of the structured layer in this application the description always refers to complete cells of a mesh and not to cells that are not complete because they are positioned at the edge of the structured layer. The material according to the invention may have a structured layer with distances between every rim node of one cell that are substantially equal. In that case the pattern of the structured layer is substantially repetitive. This circumstance may have advantages in the production of the structured layer. It is also possible that the distance between two rim nodes of one cell differ from the distance between two other rim nodes. And it is also possible that the distances between all rim nodes of one cell differ from each other.

According to yet another embodiment the cells of the mesh may have three rim nodes. It is also possible that the cells of the mesh have any other possible number of rim nodes such as four, five, six etc. In these cases the pattern of the structured layer may be substantially repetitive or it may be not repetitive at all. This may have the above mentioned advantage.

Another possibility is that the number of rim nodes differ from cell to cell in the mesh according to the invention.

The length of the electrically conductive rim between two rim nodes may be substantially equal. It is also possible to have a pattern of the structured layer with different lengths of the electrically conductive rims between two rim nodes. When the electrically conductive rim of a cell is relatively wide it is possible to define the length of the rim as being the length of a centre line of the rim, a centre line being the line that runs substantially along the middle of the electrically conductive rim.

The electrically conductive rim may have a meandered shape. In one embodiment, the meandered shape is formed like a meandering wave. Starting from a rim node the amplitude of the waves or the meander width may become bigger until it reaches a maximum and than become smaller until the rim hits the next rim node. Using electrically conductive rims with a meandered shape is a simple way to increase the area of the carrier layer according to the invention that is covered with conductive parts of the structured layer thereby providing a good antistatic characteristic and at the same time still keeping the conductivity so low that the influence of eddy currents created in the structured layer is low enough. The electrically conductive rim may have any other kind of irregular shape or pattern. It is also possible that the shape of the electrically conductive rim between two rim nodes has a regular shape like for example—but not limited to—a line or straight shape or sine waves.

The mesh of the cells with their respective rims may have a repetitive and/or periodic pattern. By this feature it is achieved that the antistatic and RFID-transmissive characteristics of the material according to the invention are substantially the same all over the material. As mentioned above a regular and/or periodic pattern may also have advantages in the production of the structured layer. It is also possible that the cells with their respective rims have an irregular or not repetitive pattern. Such an embodiment may have antistatic and RFID-transmissive characteristics that vary over the surface of the material according to the invention.

The material according to the invention may comprise a structured layer with electrically conductive rims having an essentially linear shape. In the context of the invention a "linear shape" does mean that the rims have substantially the same width along their length irrespective of any curves that may be present. By rims having a linear shape it is achieved that the conductivity of the electrically conductive rims is substantially the same along their length. That results in antistatic and RFID-transmissive characteristics of the material according to the invention that are substantially the same over the entire surface of the material. It is also possible that the shape of the electrically conductive rim is not linear, e.g. that the width of the rims differs along their length.

The electrically conductive rims of the material according to the invention may comprise electrically conductive branches extending from the electrically conductive rim. Those branches may be essentially linear shaped branches out of electrically conductive material that branch off at an electrically conductive rim of a cell of a mesh according to the invention and extend into the direction of the interior of the cell. The branches may also extend into another direction away from the interior of the cell. The branches do not cross or contact a second rim. They just end. All branches on the structured layer may have the same length. It is also possible that only a few branches have the same length and that the rest of the branches have a different length. Furthermore is it possible that the branches have a meandered shape. It is also possible that the branches have any other shape as described above in connection with the electrically conductive rims. The branches may be integrated in the repetitive pattern of the cells. The branches may not fit into the repetitive pattern at all. The branches may have an essentially linear shape as defined above (substantially same width along their length). And it is possible that the branches have an irregular shape as also defined above.

According to one embodiment of the invention the conductivity of the structured layer is more than $10^5$ S/m (Siemens pro Meter). In a preferred embodiment the conductivity of the structured layer is higher than $10^6$ S/m. In another embodiment the conductivity of the structured layer is higher than $3 \times 10^7$ S/m. These data are typical for a conductive layer made out of metal. Other materials may have a conductivity that is some magnitudes lower.

The structured layer may comprise any material that is conductive such as for example metal, semiconductor and/or electrically conductive plastic.

The carrier layer may comprise any material that is non conductive such as for example plastic, foam, paper, cardboard, wood, in general all kind of non-conductive materials that may be used for packaging.

The material according to the invention may be made by putting an electrically conductive layer onto the carrier layer and then pattering it in a subsequent work step. For example the structure can be made by dry phase pattering without the use of wet-chemical methods such as by scratching. It is of course also possible to use any other pattering direct or indirect, additive or subtractive methods, e.g. patterned vapour deposition, printing with a protective substance and a subsequent wet or dry etching method. For metals for example, the structure can be made by wet chemical means using etching processes, by dry process steps such as dry etching cutting and/or punching processes and/or by dry patterning using impression the impressed points being removed with a knife and/or being able to be filled with another material.

It is also possible to put an already patterned electrically conductive layer onto the carrier layer, as is possible by means of printing (e.g. conductive pastes, conductive silver, organically based materials) or bonding/lamination (e.g. aluminum, copper, silver), for example. The structured layer can also be put on in patterned form by vapour deposition and/or sputtering. Other methods are lamination, electroplating, spraying, dunking, blade coating and/or printing.

BRIEF DESCRIPTION OF THE DRAWINGS

The invention will now be described in more detail with reference to the following Figures exemplifying particular embodiments of the invention.

DETAILED DESCRIPTION

Figure 1:
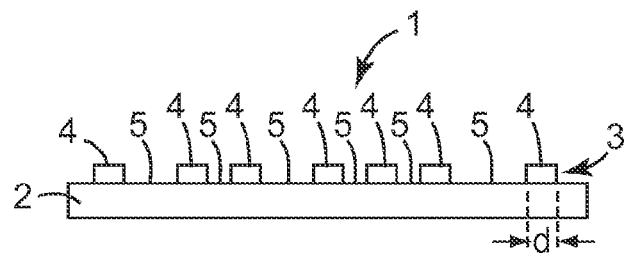
FIG. 1 a sectional view of a material according to the invention.

Herein below various embodiments of the present invention are described and shown in the drawings wherein like elements are provided with the same reference numbers.

FIG. 1 shows a sectional view of a material 1 according to the invention. The material 1 comprises a carrier layer 2 and a structured layer 3. The structured layer 3 is arranged on top of the carrier layer 2 and is fixedly arranged at the carrier layer 2. Because of the sectional view only parts of the structured layer 3 can be seen. Those parts are sectional views of electrically conductive rims 4 and sectional views of electrically non conductive interiors 5 of cells of a mesh (cells and mesh are not shown in FIG. 1). The electrically conductive rims 4 shown in FIG. 1 all have substantially the same width d. It is also possible that the rims 4 have different widths d.

Figure 2:
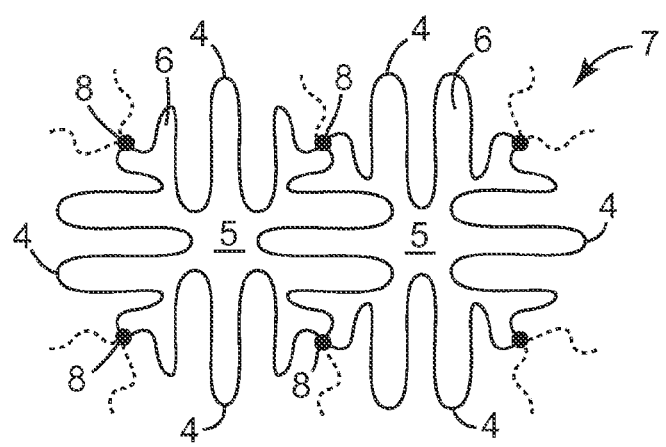
FIG. 2 two cells of a mesh of a structured layer of the material according to the invention, each cell comprising four rim nodes.

FIG. 2 shows two cells 6 of a mesh 7 of a structured layer 3 of the material 1 according to the invention. Each cell 6 has an electrically non conductive interior 5 and an electrically conductive rim 4. The electrically conductive rims 4 have a meandered shape. The length of the rims 4 of each cell 6 is substantially equal and the rims 4 have a substantially linear shape. Furthermore, each cell 6 comprises four rim nodes 8. A rim node 8 is a point where the electrically conductive rims 4 of the cells 6 meet and/or cross each other. In the embodiment of FIG. 2 the four rim nodes 8 of the cells 6 are arranged in a regular, repetitive square manner. In other words the four rim nodes 8 of one cell are arranged in the corners of a square. The two cells 6 of FIG. 2 are interconnected with each other so that they share that portion of their electrically conductive rim 4 that is arranged between two rim nodes 8. To create a mesh 7 of cells 6 it is necessary to arrange further cells 6 next to the two cells shown in FIG. 2 as indicated by the dotted lines. By that each cell 6 will share each of its rims 4 with another cell 6. Each part of a central cell's rim is shared.

Figure 3:
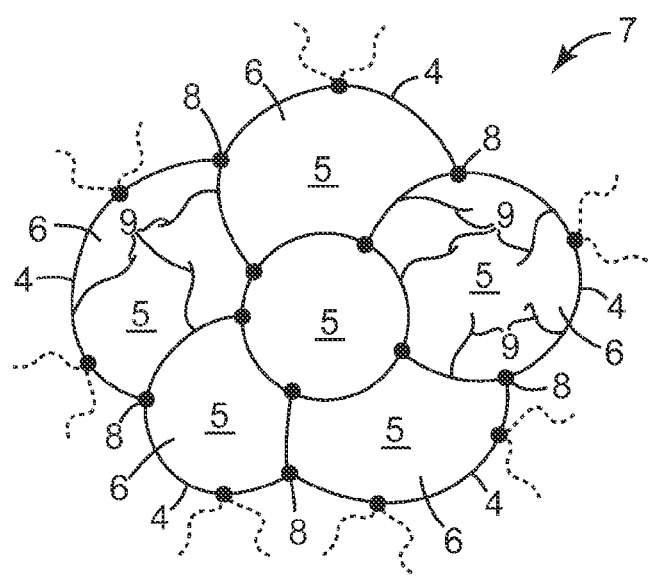
FIG. 3 six cells of the structured layer of the material according to the invention, wherein each cell comprises a different number of rim nodes.

FIG. 3 shows six cells 6 of a mesh 7 of a structured layer 3 of the material 1 according to the invention. Each cell 6 has an electrically non conductive interior 5 and an electrically conductive rim 4. The shape of the electrically non conductive interior 5 is substantially round. The rims 4 have a substantially linear shape. Furthermore, each cell 6 comprises rim nodes 8. In contrast to the embodiment shown in FIG. 2 each of the cells 6 of the embodiment shown in FIG. 3 may have a different number of rim nodes 8. Furthermore, the rim nodes 8 are not arranged in a regular, repetitive manner, but they are arranged in an irregular manner. Two cells 6 of the embodiment shown in FIG. 3 are interconnected with each other so that they share that portion of their electrically conductive rim 4 that is arranged between two rim nodes 8. To create a mesh 7 of cells 6 it is necessary to arrange further cells 6 next to the cells shown in FIG. 3 as indicated by the dotted lines. By that each cell 6 will share each of its rims 4 with another cell 6. Some of the cells 6 shown in FIG. 3 do have branches 9 that extend from the electrically conductive rim 4 into the non conductive interior 5 of the cells 6. The branches 9 and the electrically conductive rims 4 are electrically connected with each other. The stub wires 9 have substantially the same length. They further have an irregular but substantially linear shape.

Figure 4:
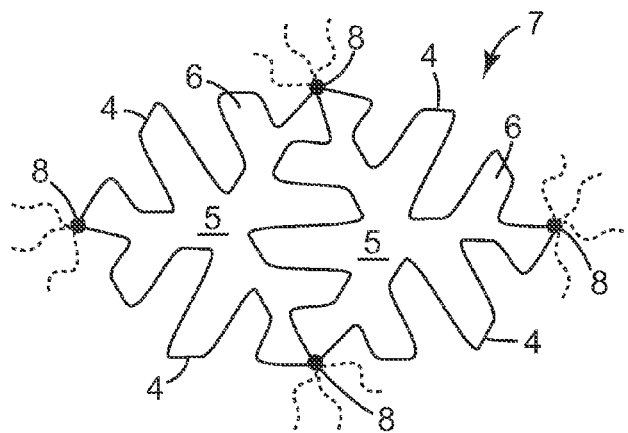
FIG. 4 two cells of a structured layer of the material according to the invention, each cell comprising three rim nodes.

FIG. 4 shows another example of cells 6 of a mesh 7 according to the invention. Two cells 6 can be seen in FIG. 4. Each cell 6 has an electrically non conductive interior 5 and an electrically conductive rim 4. The electrically conductive rims 4 have a meandered shape. The length of the rims 4 of each cell 6 is substantially equal and the rims 4 have a substantially linear shape. Furthermore, each cell 6 comprises three rim nodes 8. In the embodiment of FIG. 4 the three rim nodes 8 of the cells 6 are arranged in a regular, repetitive manner. The three rim nodes 8 of one cell are arranged in the corners of a triangle. The two cells 6 of FIG. 4 are interconnected with each other so that they share that portion of their electrically conductive rim 4 that is arranged between two rim nodes 8. To create a mesh 7 of cells 6 it is necessary to arrange further cells 6 next to the two cells shown in FIG. 4 as indicated by the dotted lines. By that each cell 6 will share each of its rims 4 with another cell 6.

Figure 5A:
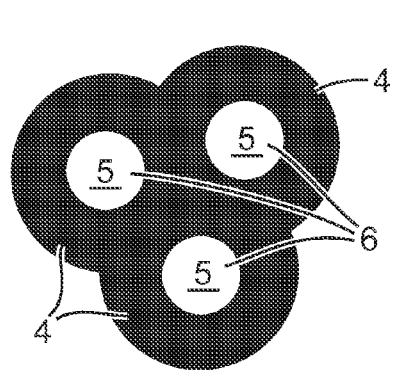
FIG. 5 A, B, C cells in an embodiment of the invention where the conductive rims are wide compared to the diameter of the non conductive interior, and how to determine the position of the rim nodes.
Figure 5B:
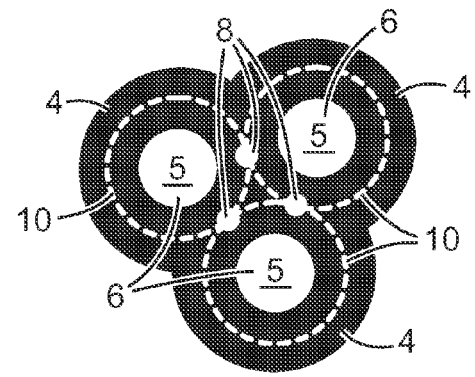
Figure 5C:
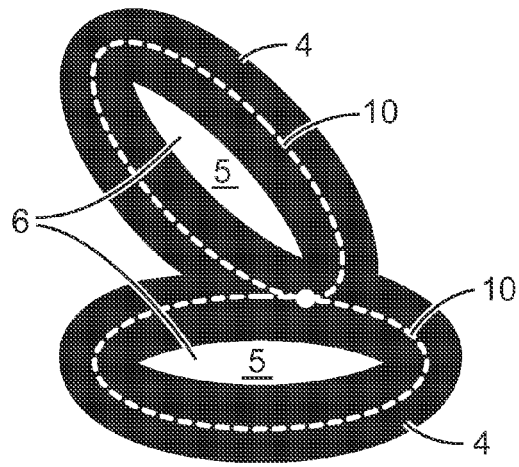

FIG. 5A shows three cells 6 of an embodiment of the invention, wherein circular cells 6 have line shaped wide conductive rims 4, as compared to the diameter of their respective nonconductive interiors 5. FIG. 5B exemplifies how a rim node 8 in embodiments with wide rims 4 is identified: a rim node 8 is a point at which at least two centre lines 10 meet. A centre line 10 is the middle line of a linear shaped conductive rim 4. FIG. 5C is another example of cells 6 having wide conductive rims 4, and their respective centre lines 10. The cells 6 of FIG. 5C have an essentially oval shape. For cells 6 having wide rims 4, it is possible that the centre lines 10 of their respective rims 4 don't meet, although the cells 6 share a portion of their respective rims 4. In these cases, a rim node 8 can be assumed to be located at the point in the middle of the shortest possible line, connecting the respective centre lines 10 of rims 4.

Figure 6:
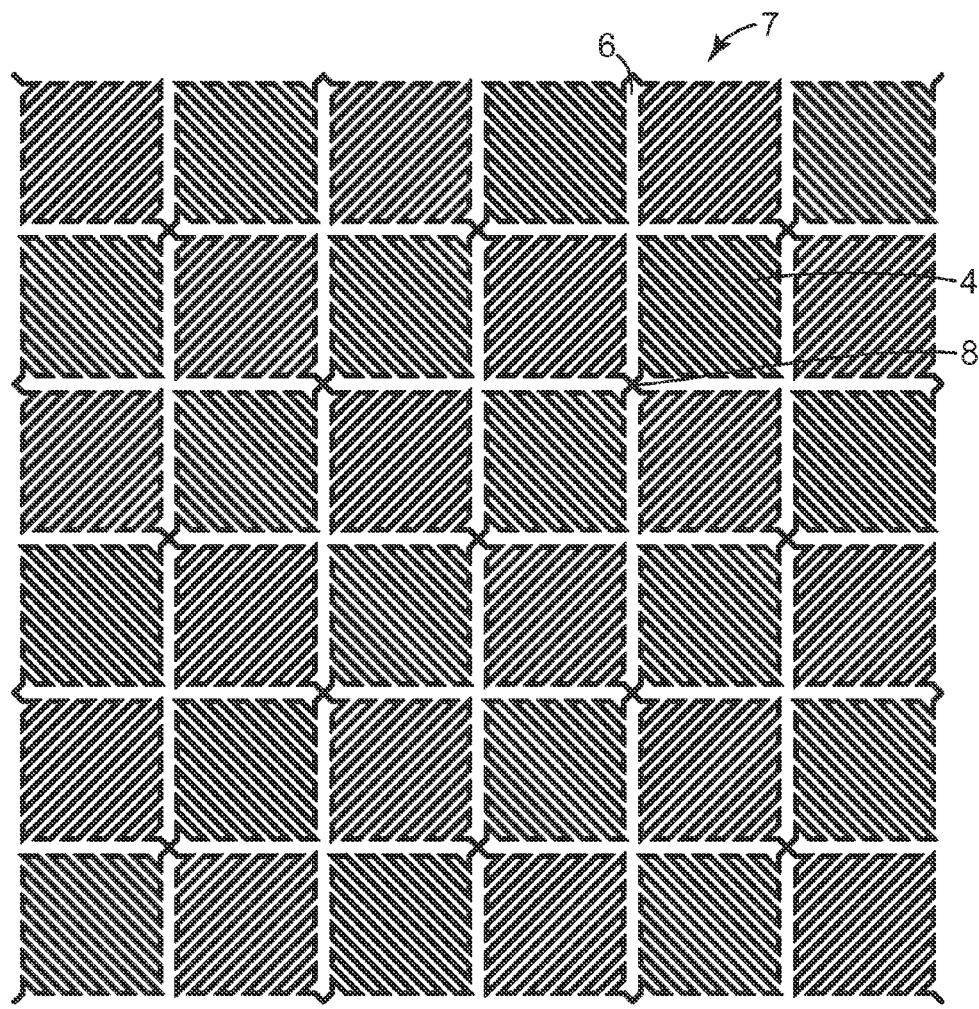
FIG. 6 an embodiment of a mesh of cells of a structured layer of a material according to the invention, each cell comprising four rim nodes.

FIG. 6 shows an embodiment of a mesh 7 with a repetitive or periodic pattern of cells 6 of a structured layer of a material according to the invention. The cells 6 have electrically conductive rims 4 and rim nodes 8. Each cell 6 has four rim nodes 4. The rim nodes 4 of each cell 6 are arranged in the corners of a square. Adjacent cells 6 share two adjacent rim nodes 4 and the electrically conductive rims 4 that extend between the rim nodes 4. At one rim node 4 four cells 6 of the mesh 7 meet. The electrically conductive rims 4 of the cells 6 have a meandered shape. All rims 4 have a substantially equal length between two rim nodes 8. The width of the amplitude of the meander starts very small, it becomes bigger until it reaches a maximum and than becomes smaller until the rim hits the next rim node 8. The maximum of the amplitude of the meander is reached approximately in the middle of the distance between the two rim nodes 8 that the electrically conductive rims 4 connect. The width of the electrically conductive rims 4 is approximately the same over their entire length.

Figure 7:
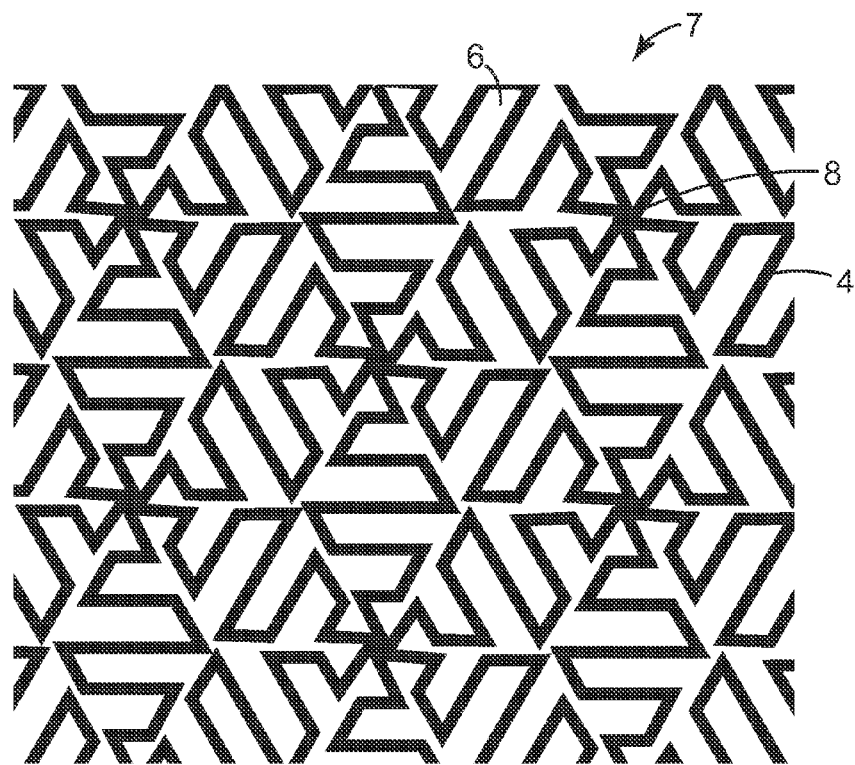
FIG. 7 another embodiment of a mesh of cells of a structured layer of a material according to the invention, each cell comprising three rim nodes.

FIG. 7 shows another embodiment of a mesh 7 with a repetitive or periodic pattern of cells 6 of a structured layer of a material according to the invention. The cells 6 have electrically conductive rims 4 and rim nodes 8. In this embodiment each cell 6 has three rim nodes 8. The rim nodes 8 of each cell 6 are arranged in a regular, repetitive pattern in the corners of a triangle. Adjacent cells 6 share two adjacent rim nodes 8 and the electrically conductive rims 4 that extend between the rim nodes 8. At one rim node 8 six cells 6 of the mesh 7 meet. The electrically conductive rims 4 of the cells 6 have a meandered shape. All rims 4 have a substantially equal length between two rim nodes 8. The width of the amplitude of the meander starts very small, it becomes bigger until it reaches a maximum and than becomes smaller until the rim hits the next rim node 8. The maximum of the amplitude of the meander is reached approximately in the middle of the distance between the two rim nodes 8 the electrically conductive rims 4 connect. The width of the electrically conductive rims 4 is approximately the same over their entire length.

Figure 8:
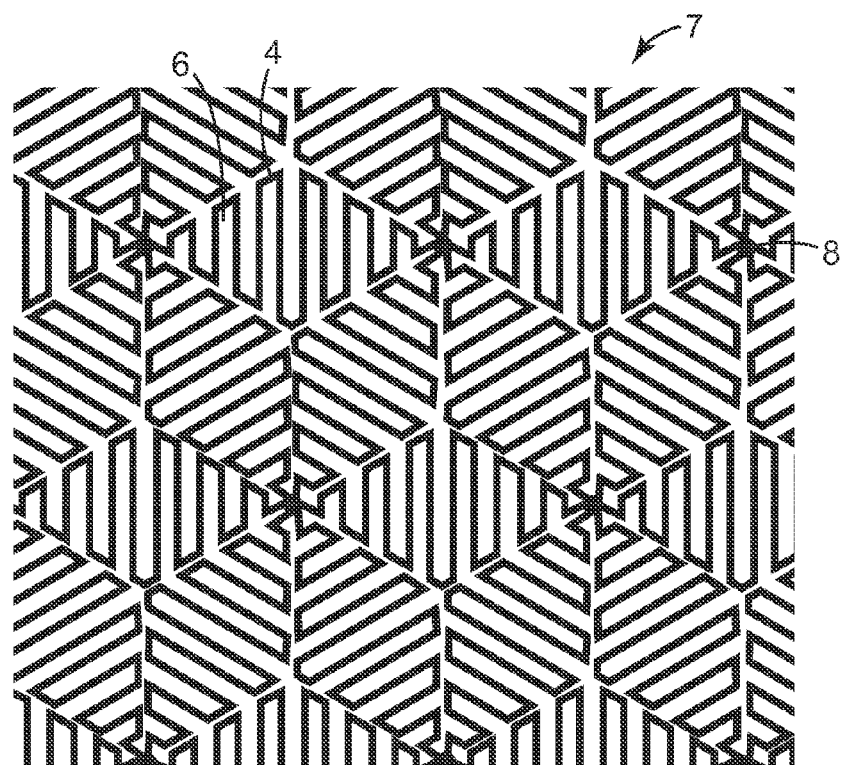
FIG. 8 a further embodiment of a mesh of cells of a structured layer of a material according to the invention, each cell comprising three rim nodes.

FIG. 8 shows an embodiment of a mesh 7 with a repetitive or periodic pattern of cells 6 of a structured layer 3 of a material 1 according to the invention. The cells 6 have electrically conductive rims 4 and rim nodes 8. Each cell 6 has three rim nodes 8. The rim nodes 8 of each cell 6 are arranged in the corners of a triangle. Adjacent cells 6 share two adjacent rim nodes 8 and the electrically conductive rims 4 that extend between the rim nodes 8. At one rim node 8 six cells 6 of the mesh 7 meet. The electrically conductive rims 4 of the cells 6 have a meandered shape. All rims 4 have a substantially equal length between two rim nodes 8. The width of the amplitude of the meander starts very small, it becomes bigger until it reaches a maximum and than becomes smaller until the rim hits the next rim 4 node 8. The maximum of the amplitude of the meander is reached approximately in the middle of the distance between the two rim nodes 8 the electrically conductive rims 4 connect. The width of the electrically conductive rims 4 is approximately the same over their entire length.

Figure 9:
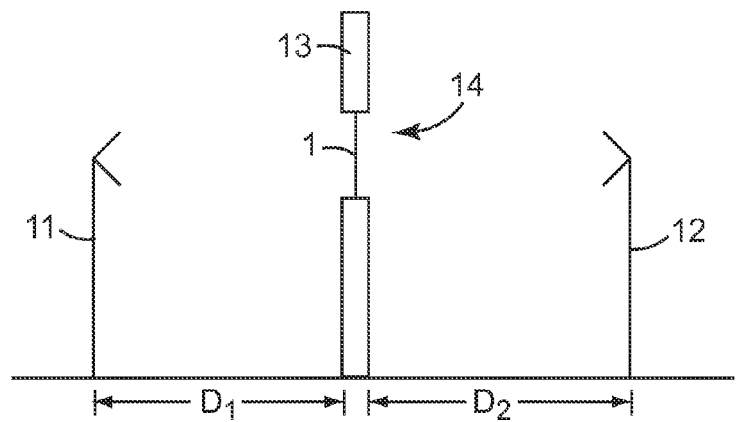
FIG. 9 installation for an experiment to identify how RFID-transmissive the material according to the invention is, and FIG. 10 results of the experiment described in connection with FIG. 9.

FIG. 9 shows a principle installation for an experiment to identify how RFID-transmissive the material 1 according to the invention is. On the left hand side can be seen a transmitting antenna 11 and on the right hand side can be seen a receiving antenna 12. Between transmitting 11 and receiving antenna 12 a frame 13 with an opening 14 is arranged. The opening provides the possibility of fixing a material 1 according to the invention so that it is possible to send electromagnetic waves from the transmitting antenna 11 to the receiving antenna 12 and the other way round. The distance D1 between the transmitting antenna 11 and the frame 13 is approximately 2 m and the distance D2 between the frame 13 and the receiving antenna 12 is also approximately 2 m. The distances D1 and D2 should be at least two times the length of the wave length.

Before starting the experiment calibration measurements were done. The first calibration measurement was done without any test material in the opening 14 of the frame 13 (almost no dampening or attenuation). The transmitting antenna 11 sent electromagnetic waves of varying frequency through the opening. The range of frequencies started at 0.3 GHz and it ended at 1.0 GHz. The electromagnetic waves were received and measured by the receiving antenna 12. The second calibration measurement was done with a metal foil in the opening 14 of the frame 13 (high attenuation rate). The transmitting antenna 11 sent electromagnetic waves in the above mentioned range through the metal foil and the receiving antenna 12 measured the waves that were transmitted through the metal foil.

Figure 10:
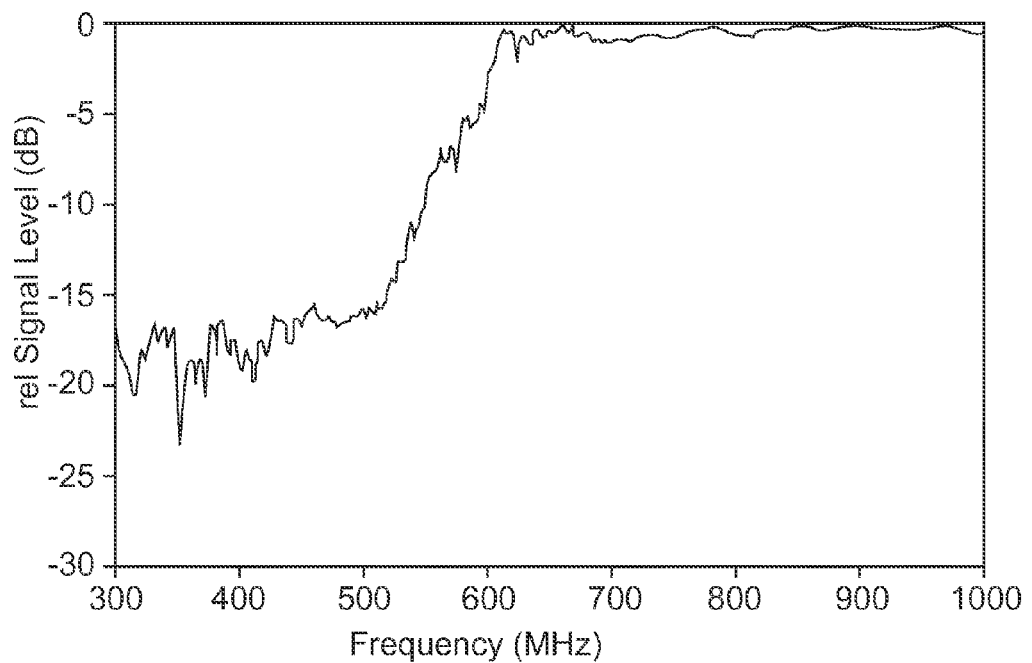

After the calibration measurements different materials according to the invention were put into the frame and exposed to the same range of electromagnetic waves. Examples of the materials according to the invention that were tested are shown in FIGS. 7 and 8. The results of the measurements of the material shown in FIG. 8 are shown in FIG. 10. The diagram in FIG. 10 does show the damping rate in dB (Decibel) over the frequency in MHz (Megahertz). It can be seen that the damping rate is quite high (between −15 and −20 dB) up to a frequency of little over 600 MHz. From there the damping rate is almost zero for rising frequencies. There are RFID-communication systems commercially available that use a frequency around 860 MHz. For this frequency the material of FIG. 8 is according the results shown in FIG. 10 RFID-transmissive. As described above it has also antistatic characteristics due to the pattern of its structured layer. Therefore this material may be used for packaging of any products carrying a RFID-tag and being shielded from any potential electrostatic impact.

REFERENCE SIGNS LIST

1 material
2 carrier layer
3 structured layer
4 conductive rim
5 non conductive interior
6 cell
7 mesh
8 rim node
9 branch
10 centre line
11 transmitting antenna
12 receiving antenna
13 frame
14 opening

What is claimed is:

1. A material for packaging of electronic components comprising a carrier layer and a structured layer, wherein said structured layer comprises a mesh of cells, each cell comprising an electrically conductive rim and an electrically non-conductive interior, said cells being interconnected so that any two adjacent cells share at least a portion of their respective rims, wherein the electrically conductive rim has a meandered shape, more than two cells meeting each other at a rim node, a width of an amplitude of a meandered rim increasing from a rim node to a maximum and then decreasing toward a next rim node.

2. The material according to claim 1, wherein the structured layer at least partially covers the carrier layer.

3. The material according to claim 1, wherein the structured layer and the carrier layer are arranged in a substantially parallel manner.

4. The material according to claim 1, wherein the distance between every rim node of one cell is substantially equal.

5. The material according to claim 1, wherein every cell of the mesh has three rim nodes or four rim nodes.

6. The material according to claim 1, wherein the length of the electrically conductive rim between two rim nodes is substantially equal.

7. The material according to claim 1, wherein the mesh of cells has a substantially repetitive and/or periodic pattern.

8. The material according to claim 1, wherein the electrically conductive rim comprises at least one electrically conductive branch extending from the electrically conductive rim.

9. The material according to claim 1, wherein the structured layer comprises metal, semiconductor and/or electrically conductive plastics.

10. The material according to claim 1, wherein the carrier layer comprises plastic, cardboard, wood and/or paper.

* * * * *